UNITED STATES PATENT OFFICE.

MORITZ ULRICH, OF ELBERFELD, GERMANY, ASSIGNOR TO THE FARBENFABRIKEN, VORMALS FR. BAYER & CO., OF SAME PLACE.

VIOLET AZO DYE.

SPECIFICATION forming part of Reissued Letters Patent No. 11,308, dated February 21, 1893.

Original No. 476,335, dated June 7, 1892. Application for reissue filed October 5, 1892. Serial No. 447,959. Patented in France April 9, 1891, No. 212,648, and in Italy April 27, 1891, XXV, 29,631.

*To all whom it may concern:*

Be it known that I, MORITZ ULRICH, chemist, doctor of philosophy, a subject of the Emperor of Germany, (assignor to the FARBENFABRIKEN, VORMALS FR. BAYER & CO., of Elberfeld,) residing at Elberfeld, Germany, have invented a new and useful Improvement in the Manufacture of Dye-Stuffs, of which I give in the following a clear and exact description, and for which the aforesaid FARBENFABRIKEN have already obtained Letters Patent in France, No. 212,648, dated April 9, 1891, and in Italy, XXV, No. 29,631, dated April 27, 1891.

My invention relates to the production of a new violet coloring-matter by the action of diazotized paramidophenol upon the sodium salt of the dihydroxynaphthaline monosulpho-acid S of my Letters Patent No. 444,679. dated January 13, 1891.

For carrying out my invention practically I proceed as follows: 10.9 kilos of paramidophenol are diazotized in the well known manner by a watery solution of seven kilos of sodium nitrite, and the resulting liquid containing the formed diazo compound is allowed to flow into a solution of 26.2 kilos of the dihydroxynaphthaline monosulphonate of sodium and sixty kilos of sodium acetate. The production of the coloring-matter immediately begins. After twenty-four hours the whole liquid is heated for a short time in order to complete the reaction. The formed dye-stuff is thereupon salted out, filtered off, and dried. Its composition corresponds with the formula:

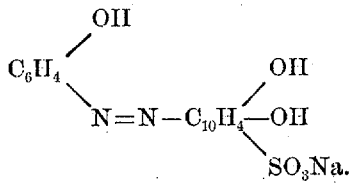

My new coloring-matter represents a dark brown powder, which is soluble in water, especially in hot water, with bluish-red color. Out of these watery solutions bluish-red flakes are precipitated on the addition of acids. It dissolves in sodium carbonate, soda-lye, and ammonia liquid with yellowish-red color. In concentrated sulphuric acid it is soluble with reddish-blue color. This solution assumes at first, when mixed with a small quantity of cold water, a yellowish-brown color. Then yellowish-brown flakes are separated, and on the addition of a great quantity of water the whole is dissolved, a clear bluish-red solution resulting. The new product dyes wool in acid baths a beautiful violet of great fastness to air and sunlight.

Having thus described my invention and in what manner it can be performed, that which I claim as new, and desire to secure by Letters Patent, is—

1. The process of making a new azo dye-stuff of the formula:

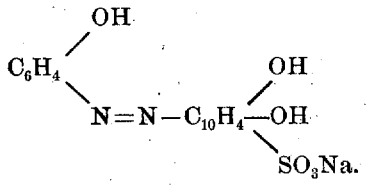

by combining the diazo compound of paramido-phenol with the sodium salt of dihydroxynaphthaline monosulpho-acid.

2. As a new manufacture, the azo coloring-matter which forms a dark brown powder soluble in water, especially hot water, with bluish-red color, from which bluish-red flakes separate on the addition of acids, soluble in alkalies with yellowish-red color, soluble in concentrated sulphuric acid with reddish-blue color, this solution assuming first, when mixed with a small quantity of cold water, a yellowish-brown color, then yellowish-brown flakes are separated, and on further dilution the whole is dissolved to a clear bluish-red solution, and which dyes wool in acid baths a clear violet.

In testimony whereof I have signed my name in the presence of two subscribing witnesses.

MORITZ ULRICH.

Witnesses:
WM. ESSENWEIN,
RUDOLPH FRICKE.